United States Patent
Hoffenberg et al.

(10) Patent No.: US 11,214,351 B2
(45) Date of Patent: Jan. 4, 2022

(54) WING, AIRCRAFT, AND METHOD FOR DELAYING WING STALL OF AN AIRCRAFT

(71) Applicant: The Boeing Company, Chicago, IL (US)

(72) Inventors: Robert Hoffenberg, Seattle, WA (US); Adam P. Malachowski, Lynnwood, WA (US); Bonnie R. Smith, Everett, WA (US); Eric E. Adamson, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 508 days.

(21) Appl. No.: 15/997,343

(22) Filed: Jun. 4, 2018

(65) Prior Publication Data

US 2019/0367152 A1 Dec. 5, 2019

(51) Int. Cl.
 *B64C 3/14* (2006.01)
 *B64C 9/24* (2006.01)
 *B64D 27/18* (2006.01)

(52) U.S. Cl.
 CPC ............... *B64C 3/14* (2013.01); *B64C 9/24* (2013.01); *B64C 2003/146* (2013.01); *B64C 2003/149* (2013.01); *B64D 27/18* (2013.01)

(58) Field of Classification Search
 CPC ........ B64C 2003/146; B64C 2003/144; B64C 3/14; B64C 3/16
 See application file for complete search history.

(56) References Cited

U.S. PATENT DOCUMENTS

| | | | | |
|---|---|---|---|---|
| 3,285,542 A | * | 11/1966 | Holmquist | B64C 17/00 244/91 |
| 3,556,439 A | | 1/1971 | Autry et al. | |
| 3,734,431 A | * | 5/1973 | Rhodes | B64C 3/40 244/49 |
| 4,050,651 A | * | 9/1977 | Neal | B64C 3/14 244/15 |
| 4,655,412 A | * | 4/1987 | Hinkleman | B64C 3/14 244/35 R |
| 4,702,441 A | * | 10/1987 | Wang | B64C 9/24 244/204 |
| 5,039,032 A | * | 8/1991 | Rudolph | B64C 23/069 244/35 R |
| 6,796,534 B2 | | 9/2004 | Beyer et al. | |
| 7,475,848 B2 | * | 1/2009 | Morgenstern | B64C 23/04 244/35 R |
| 8,128,038 B2 | * | 3/2012 | Whitehouse | B64C 23/06 244/214 |
| 10,040,559 B2 | * | 8/2018 | Hoisington | B64C 7/00 |
| 10,829,206 B2 | * | 11/2020 | Wood | B64C 3/16 |
| 2019/0300143 A1 | * | 10/2019 | Harrison | B64C 1/26 |

OTHER PUBLICATIONS

"Leading Edge Cuff", Wikipedia, Mar. 20, 1028, pp. 1-5.
"High-Lift System on Commercial Subsonic Airliners", Peter K.C. Rudolph, Nasa Contractor Report 4746, Sep. 1996, pp. 1-166.

\* cited by examiner

*Primary Examiner* — Brian M O'Hara
(74) *Attorney, Agent, or Firm* — Walters & Wasylyna LLC (57) ABSTRACT

A wing includes: an inner end configured to be coupled to a fuselage of an aircraft; an inboard section extending from the inner end; a fixed leading edge of the inboard section having a drooped contour positioned along at least a portion thereof; and an outboard section extending from the inboard section.

20 Claims, 7 Drawing Sheets

WING, AIRCRAFT, AND METHOD FOR DELAYING WING STALL OF AN AIRCRAFT

FIELD

The present application relates to the field of aircraft wing design.

BACKGROUND

A high-lift device is a component or mechanism on a wing of an aircraft that increases the amount of lift produced by the wing at a given speed.

Modern jet transport aircraft use rearward swept wings to achieve transonic cruise speeds. Unfortunately, the reduced lift of a rearward swept wing tends to increase all operating speeds. While high cruise speeds are desirable, fast takeoff and landing speeds are not. High-lift devices temporarily alter the configuration of the wing, in order to maintain reasonable takeoff and landing speeds. These high-lift devices typically include leading and trailing edge devices. Leading edge (LE) devices, such as simple or variable camber (VC) Krueger flaps and two- or three-position slats, add lift by increasing the angle of attack at which large-scale flow separation (stall) occurs on the wing. Trailing edge devices, such as Fowler flaps with single, double, or triple slots, increase lift by adding camber and increasing wing area.

Accordingly, those skilled in the art continue with research and development in the field of field of aircraft wing modifications.

SUMMARY

In one embodiment, a wing, includes: an inner end configured to be coupled to a fuselage of an aircraft; an inboard section extending from the inner end; a fixed leading edge of the inboard section having a drooped contour positioned along at least a portion thereof; and an outboard section extending from the inboard section.

In another embodiment, an aircraft includes: a fuselage having a forward end and an aft end; a wing coupled to the fuselage, the wing having a leading edge and a trailing edge; and an engine coupled to the wing, wherein the leading edge comprises a fixed leading edge inboard of the engine having a drooped contour along at least a portion thereof.

In yet another embodiment, a method for delaying wing stall of an aircraft includes flying an aircraft having a fixed leading edge with a drooped contour at a cruising speed.

Other embodiments of the disclosed wing, aircraft, and method for delaying wing stall of an aircraft will become apparent from the following detailed description, the accompanying drawings and the appended claims.

DETAILED DESCRIPTION

Figure 1:
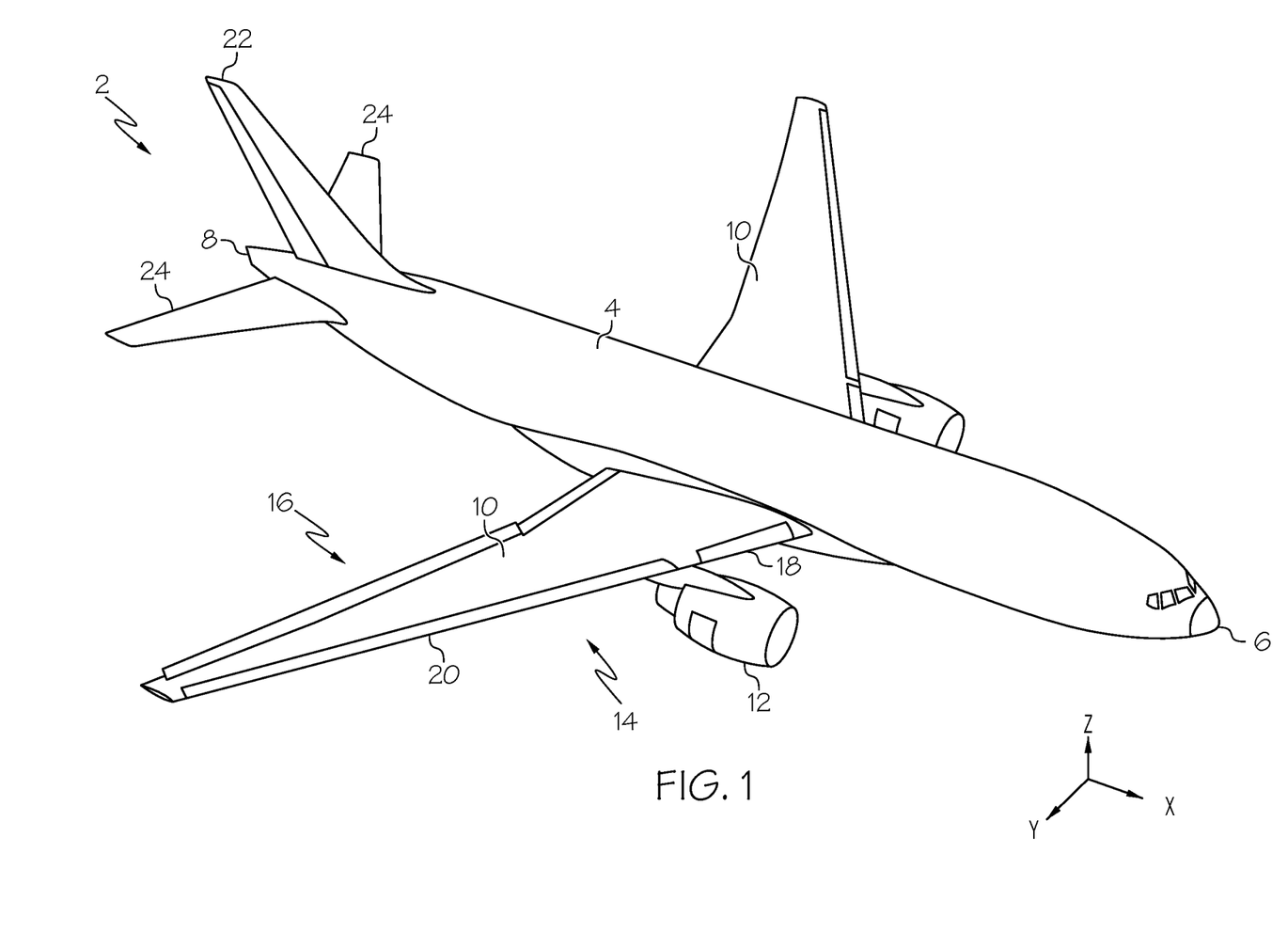
FIG. 1 is a perspective view of an exemplary aircraft 2 according to an embodiment of the present application.

FIG. 1 is a perspective view of an exemplary aircraft 2 according to an embodiment of the present application.

As shown in FIG. 1, the aircraft 2 includes a fuselage 4 having a forward end 6, an aft end 8, wings 10 coupled to the fuselage 4, and an engine 12 coupled to each wing 10. In an aspect, the wings 10 are coupled to a wing box of the fuselage 4 by way of a side-of-body joint.

As shown, each engine 12 is positioned at an underside of each wing 10. In an aspect, the engine 12 is a jet engine. As shown, only one engine 12 is coupled to each wing 10. However, it will be understood that the aircraft 2 may include one or more additional engines.

Each wing 10 includes a leading edge 14 and a trailing edge 16. In an aspect, the wings 10 are preferably rearward-swept wings.

The leading edge 14 of the wing 10 includes a fixed leading edge 18 inboard of the engine 12, in which the fixed leading edge 18 has a drooped contour. The length and configuration of the drooped contour would vary based upon the performance needs of the particular aircraft.

If multiple engines are coupled to each wing, then the fixed leading edge 18 having the drooped contour is inboard of the outermost engine, preferably inboard of the innermost engine.

By providing the fixed leading edge 18 with the drooped contour positioned along at least a portion thereof, low-speed operation of the wing is enhanced by the drooped contour.

In an aspect, the fixed leading edge 18 with the drooped contour can be smoothly blended into adjacent surfaces (wing, body, engine).

Moreover, by selecting a fixed leading edge 18, a conventional inboard moveable leading edge device may be avoided. Thus, the fixed leading edge 18 eliminates actuation mechanisms required for a moveable device, reduces weight and cost, simplifies wing integration and implementation of ice protection.

The leading edge 14 of the wing 10 further includes one or more moveable leading edge devices 20 outboard of the engine 12. If multiple engines are coupled to each wing, then the one or more moveable leading edge devices 20 are outboard of the innermost engine. For example, the one or more moveable leading edge devices 20 may be between the innermost engine and outermost engine, outboard of the outermost engine, or both between the innermost engine and outermost engine and outboard of the outermost engine.

The type of moveable leading edge device 20 is not limited and may include, for example, any conventional moveable leading edge device. In an aspect, the one or more moveable leading edge devices 20 are one or more slats.

The trailing edge 16 of the wing 10 includes one or more moveable trailing edge devices. The type of moveable trailing edge device is not limited and may include, for example, any conventional moveable trailing edge device. In an aspect, the one or more moveable trailing edge devices are one or more flaps.

As shown in FIG. 1, the exemplary aircraft 2 further includes a vertical stabilizer 22, which may include a rudder (not shown) and a horizontal stabilizer 24, which may include an elevator (not shown).

In an aspect, the drooped leading edge (in comparison to a conventional leading edge) has the hi-light (nose) of the airfoil further down in Z-direction (optionally further forward in X-direction). In another aspect, the drooped leading edge (in comparison to a conventional leading edge) has a larger/blunter leading edge radius (slower rate of change of slope at the leading edge, or lower curvature) compared to the conventional airfoil which has a smaller/sharper leading edge radius (higher rate of change of slope, or higher curvature).

In an aspect, the drooped contour of the fixed leading edge may have a shape such that, in a cross-section of the fixed leading edge having the drooped contour, a lower wing skin extending from the fixed leading edge has a positive change in slope proximate to the fixed leading edge and a negative change in slope further from the fixed leading edge.

In another aspect, the drooped contour of the fixed leading edge may have a shape such that, the lower wing skin has a positive change in slope even further from the fixed leading edge.

In yet another aspect, the drooped contour of the fixed leading edge may have a shape such that, the slope of the lower wing skin is negative proximate to the fixed leading edge, positive further from the fixed leading edge, and negative even further from the fixed leading edge.

Alternatively, the drooped contour of the fixed leading edge may have a shape such that, the slope of the lower wing skin is negative throughout the proximate and the further portions.

Figure 2:
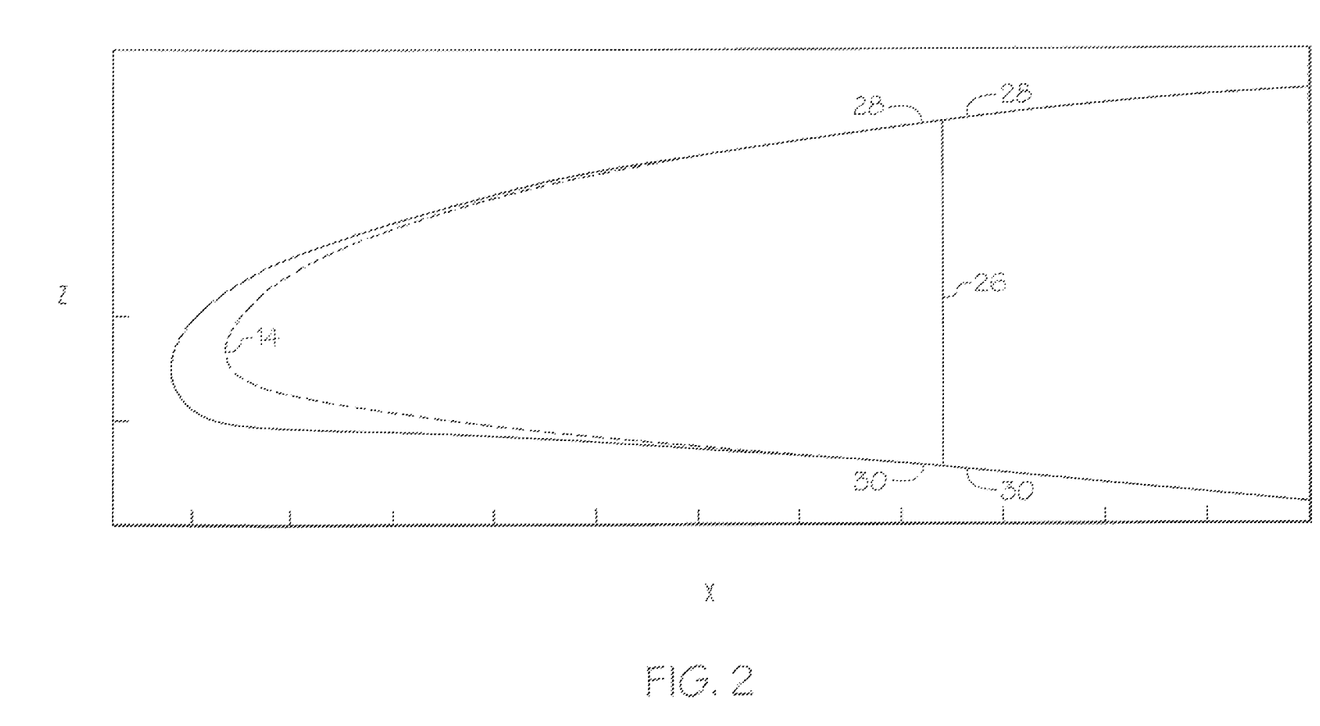
FIG. 2 is a front section of a wing showing a first exemplary fixed leading edge having a drooped contour in comparison with a conventional fixed leading edge having a conventional contour.
Figure 3:
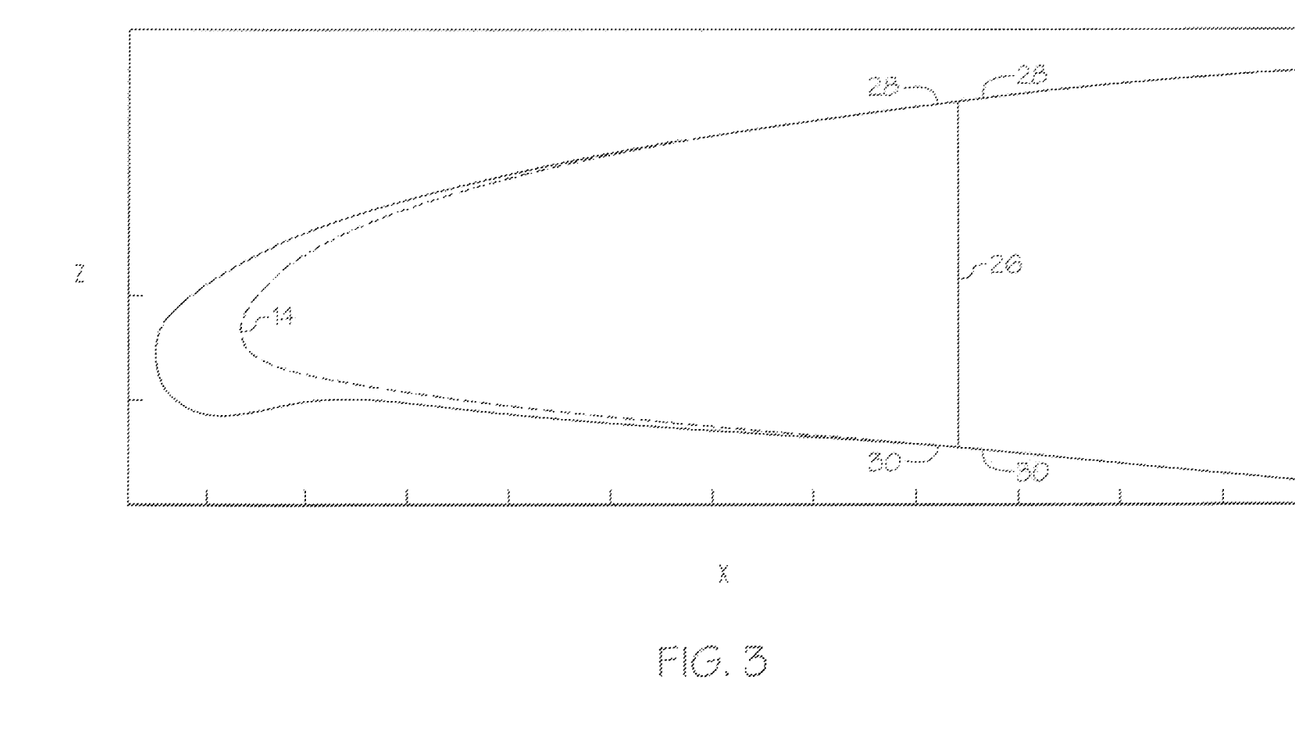
FIG. 3 is a front section of a wing showing a second exemplary fixed leading edge having a drooped contour in comparison with the same conventional fixed leading edge having the same conventional contour as FIG. 2.

FIG. 2 is a front section of a wing showing a first exemplary fixed leading edge having a drooped contour in comparison with a conventional fixed leading edge having a conventional contour. FIG. 3 is a front section of a wing 10 showing a second exemplary fixed leading edge having a drooped contour in comparison with the same conventional fixed leading edge having the same conventional contour as FIG. 2.

As shown in FIGS. 2 and 3, the wing 10 includes a fixed leading edge 18, a front spar 26 that runs spanwise between the fuselage 4 and a tip of the wing 10, an upper wing skin 28 between the front spar 26 and fixed leading edge 18, and a lower wing skin 30 between the front spar 26 and fixed leading edge 18.

As previously mentioned, the dashed lines in FIGS. 2 and 3 represent a conventional fixed leading edge having a conventional contour. As represented by the dashed lines, the slope (z/x) of the lower wing skin remains negative from the fixed leading edge 18 to the front spar 26. Moreover, the change in the slope of the lower wing skin 30 from the fixed leading edge 18 to the front spar 26 is positive proximate to the leading edge and approaches substantially constant slope proximate to the front spar 26.

In comparison, the solid line in FIG. 2 represents a first exemplary fixed leading edge having a drooped contour. As represented by the solid line, the slope (z/x) of the lower wing skin remains negative from the fixed leading edge 18 to the front spar 26. However, the change in the slope of the lower wing skin 30 from the fixed leading edge 18 to the front spar 26 is positive proximate to the fixed leading edge 18 and then the change in slope becomes negative.

The solid line in FIG. 3 represents a second exemplary fixed leading edge 18 having a drooped contour. As represented by the solid line, the slope (z/x) of the lower wing skin starts negative proximate to the fixed leading edge 18 and then becomes positive.

Figure 4:
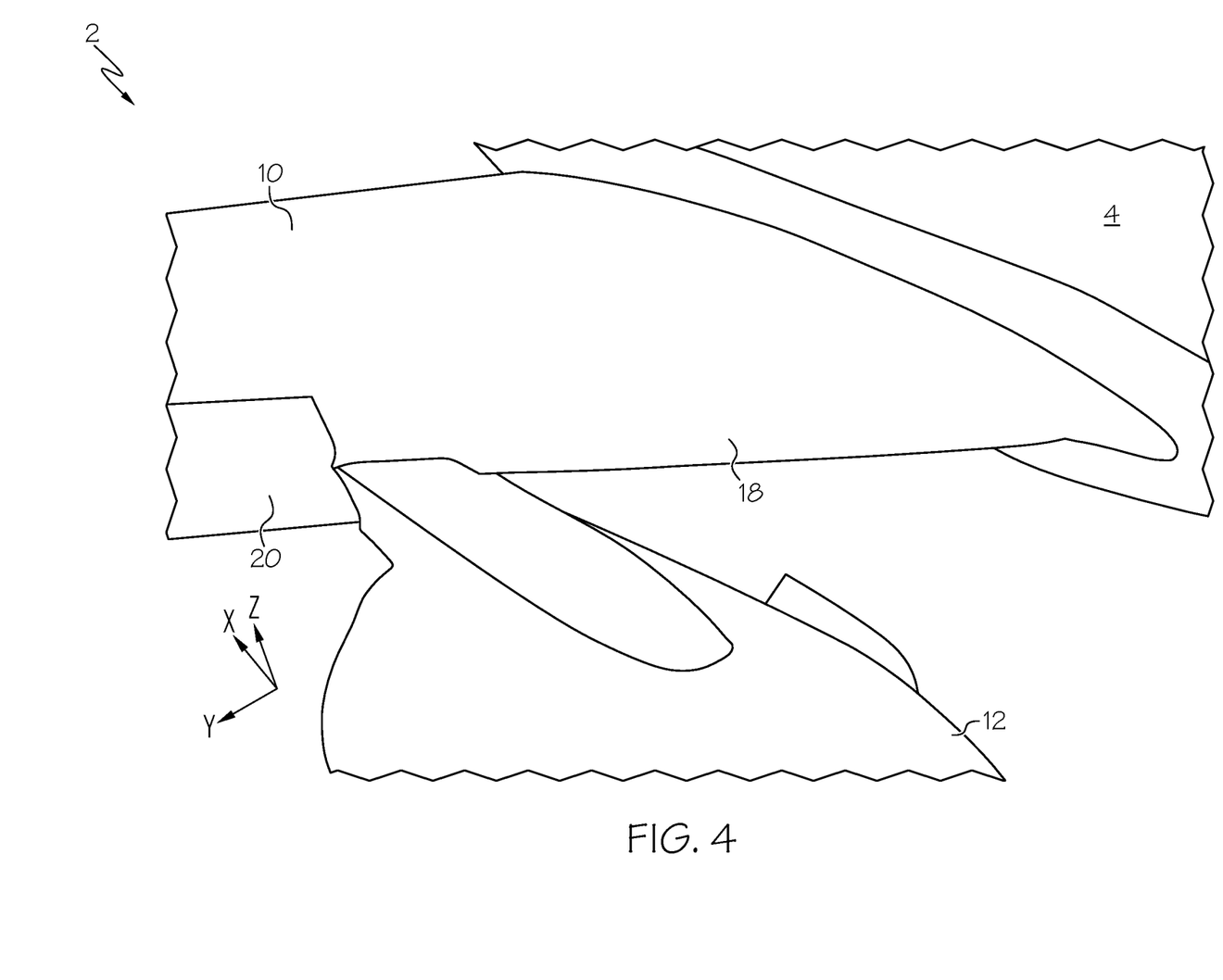
FIG. 4 is a perspective view of a portion of an exemplary aircraft illustrating a fixed leading edge inboard of an engine having a drooped contour positioned along a portion of the fixed leading edge.
Figure 5:
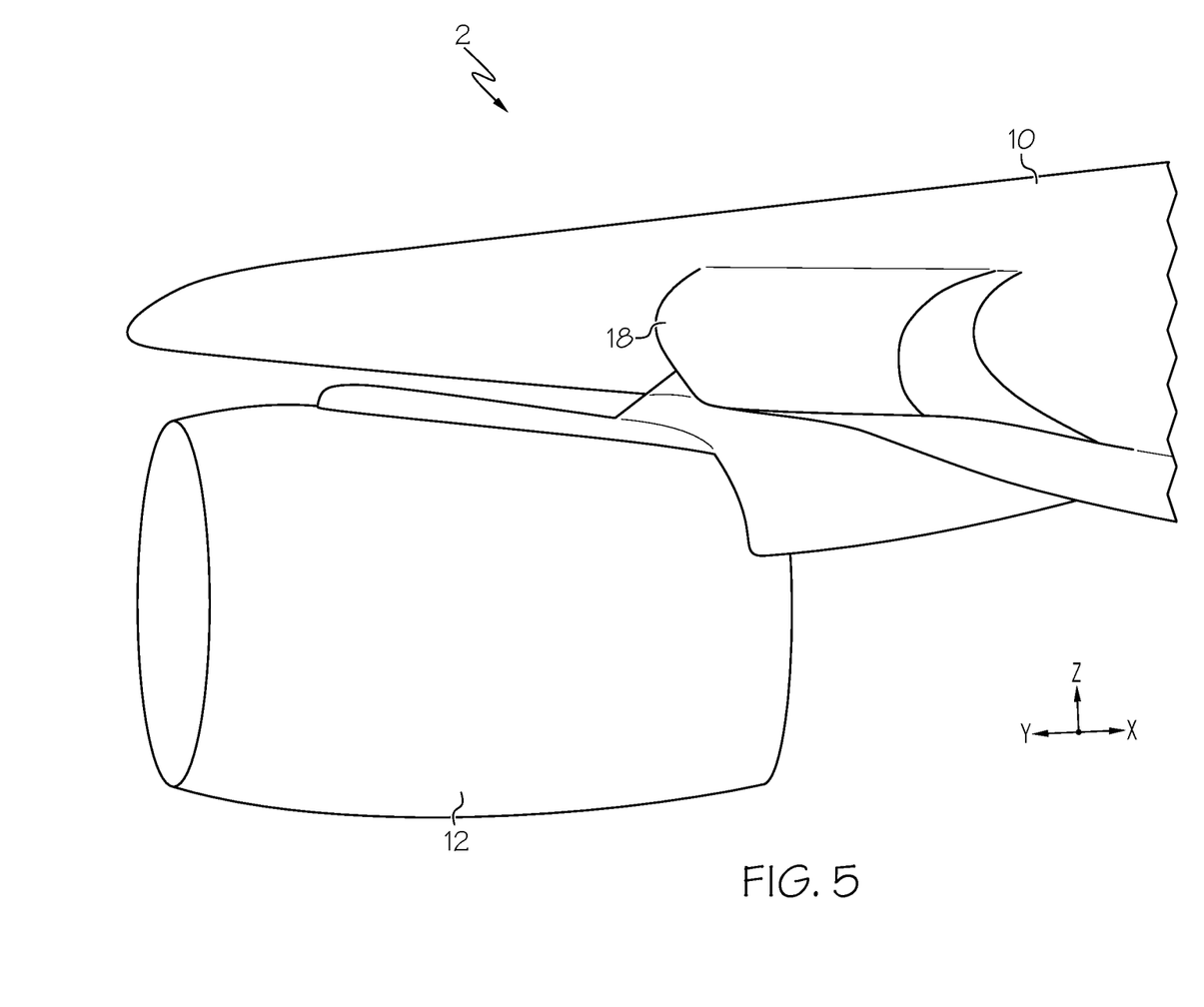
FIG. 5 is a perspective view of another portion of an exemplary aircraft illustrating a fixed leading edge inboard of an engine having a drooped contour positioned along a portion of the fixed leading edge.

FIGS. 4 and 5 are perspective views of portions of exemplary aircraft 2 illustrating a fixed leading edge 18 inboard of an engine 12 having a drooped contour positioned along a portion of the fixed leading edge 18. As shown, the drooped contour preferably has a smooth blending with adjacent non-drooped portions of the leading edge at both ends.

Figure 6:
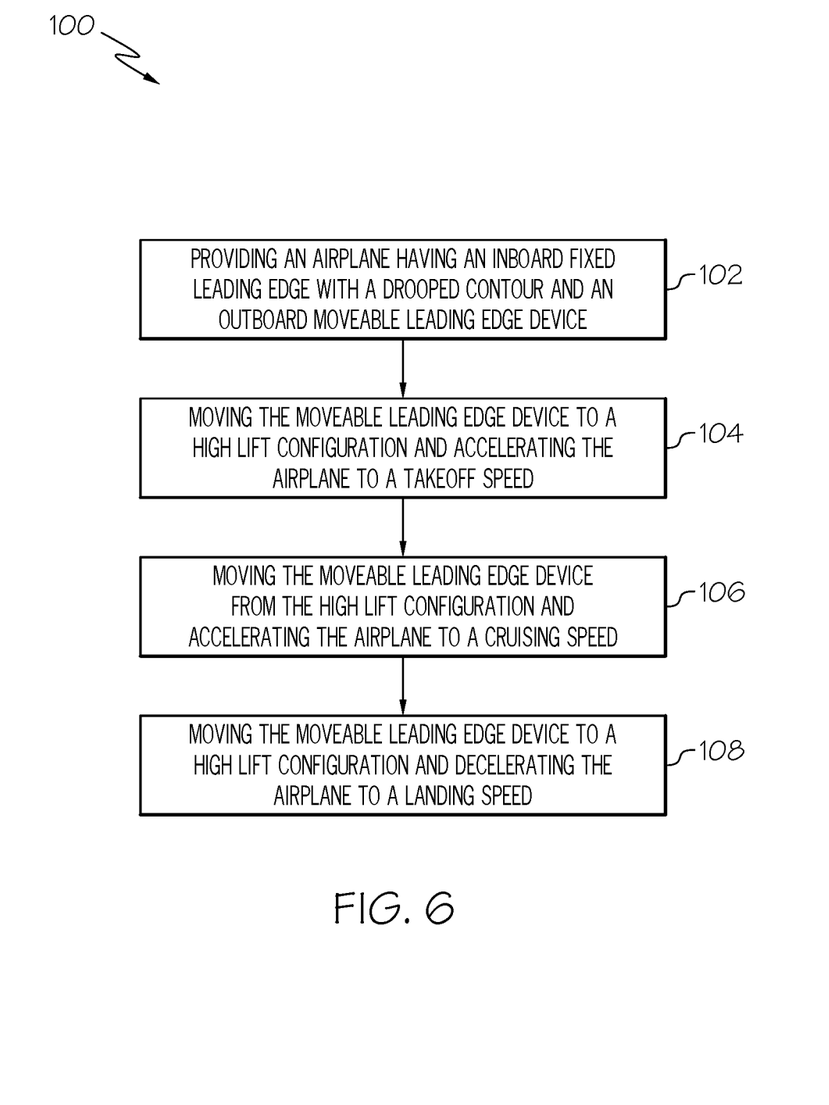
FIG. 6 is a flow diagram depicting a method of delaying wing stall of an aircraft.

FIG. 6 is a flow diagram of a method 100 of delaying wing stall of an aircraft according to an embodiment of the present application.

At block 102, the method includes providing an aircraft having an inboard fixed leading edge with a drooped contour and an outboard moveable leading edge device.

At block 104, the method includes moving the moveable leading edge device to a high lift configuration and accelerating the aircraft to a takeoff speed.

At block 106, the method includes moving the moveable leading edge device from the high lift configuration and accelerating the aircraft to a cruising speed. In an aspect, the cruising speed may be greater than the speed of sound.

At block 108, the method includes moving the moveable leading edge device to a high lift configuration and decelerating the aircraft to a landing speed.

Figure 7:
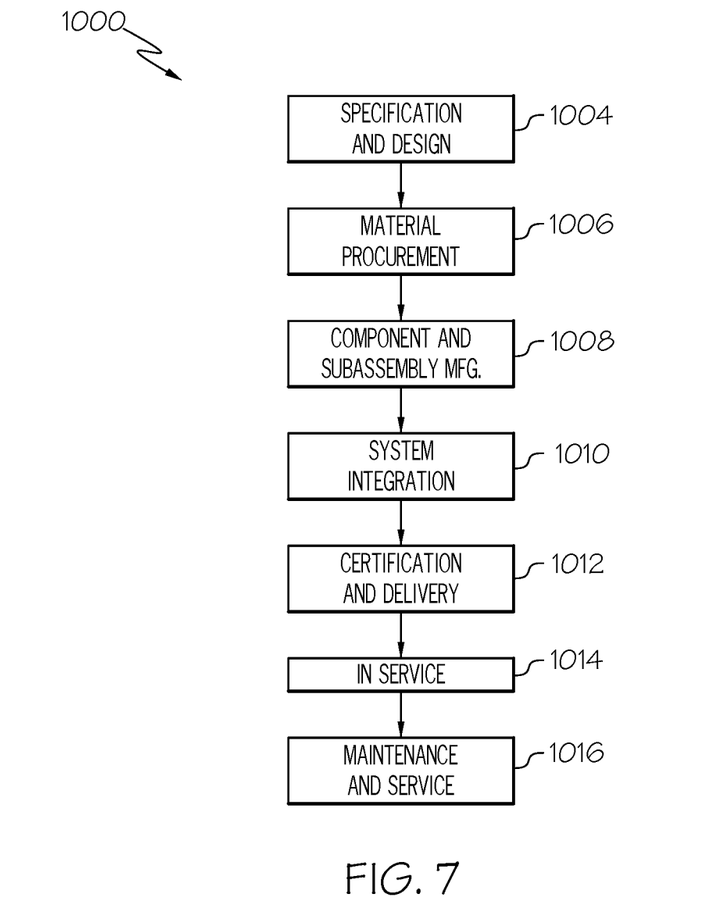
FIG. 7 is a flow diagram of an aircraft manufacturing and service methodology.
Figure 8:
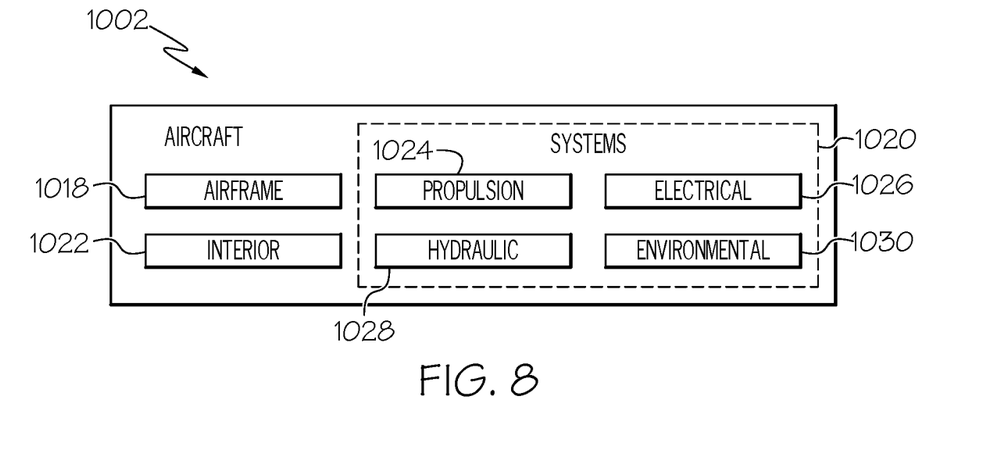
FIG. 8 is a block diagram of an aircraft.

Examples of the present disclosure may be described in the context of an aircraft manufacturing and service method 1000, as shown in FIG. 7, and an aircraft 1002, as shown in FIG. 8. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of veneers, subcontractors, and suppliers; and an operator may be an airline, leasing company, military entity, service organization, and so on.

The wings, aircrafts, and methods of delaying wing stall of an aircraft of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 7, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The methods and systems for forming perforated composite structures of the present disclosure may be employed for any of the systems of the aircraft 1002.

Although various embodiments of the disclosed wing, aircraft, and method for delaying wing stall of an aircraft have been shown and described, modifications may occur to those skilled in the art upon reading the specification. The present application includes such modifications and is limited only by the scope of the claims.

What is claimed is:

1. An aircraft comprising:
a fuselage having a forward end and an aft end;
a wing coupled to the fuselage, the wing having a leading edge and a trailing edge, the wing having a wing root and a wing tip, wherein the wing ends in a free end at the wing tip, wherein a distance between the leading edge and the trailing edge at the wing root is greater than a distance between the leading edge and the trailing edge at the wing tip; and
a jet engine coupled to an underside of the wing, wherein a front of the engine is forward of the leading edge of the wing;
one or more moveable leading edge devices along a first portion of the leading edge outboard of the jet engine,
wherein, inboard of the jet engine, the leading edge comprises a fixed drooped contour along at least a portion thereof,
wherein the fixed drooped contour is inboard of an inboard edge of the jet engine,
wherein the wing is a rearward-swept wing.

2. The aircraft of claim 1 wherein the trailing edge comprises one or more moveable trailing edge devices.

3. The aircraft of claim 1 wherein, in a cross-section of the fixed drooped contour, a lower wing skin extending from the leading edge has a positive change in slope proximate to the leading edge and a negative change in slope further from the leading edge.

4. The aircraft of claim 3 wherein, in the cross-section of the fixed drooped contour, the lower wing skin has another positive change in slope even further from the leading edge than the negative change in slope.

5. The aircraft of claim 4 wherein, in the cross-section of the fixed drooped contour, the slope of the lower wing skin is negative proximate to the leading edge, positive further from the leading edge, and negative even further from the leading edge.

6. The aircraft of claim 4 wherein, in the cross-section of the fixed drooped contour, the slope of the lower wing skin is negative proximate to the leading edge and further from the leading edge.

7. A method for delaying wing stall of the aircraft of claim 1, the method comprising:
flying the aircraft at a cruising speed, wherein the cruising speed is greater than the speed of sound.

8. The method of claim 7, further comprising moving a moveable leading edge device and decelerating the aircraft to a landing speed.

9. The method of claim 8 further comprising moving a moveable leading edge device outboard of an engine and accelerating the aircraft to a takeoff speed.

10. The aircraft of claim 1 wherein the wing is coupled to the fuselage by way of a side-of-body joint.

11. The aircraft of claim 1 wherein most of a length of the leading edge between the jet engine and the fuselage has the fixed drooped contour.

12. The aircraft of claim 1 wherein the wing comprises an upper wing skin, a lower wing skin, and a spar between the upper wing skin and lower wing skin.

13. The aircraft of claim 1 further comprising a vertical stabilizer fixed to the fuselage and a horizontal stabilizer fixed to the fuselage.

14. The aircraft of claim 1 wherein a rear of the jet engine is aft of the leading edge of the wing.

15. The aircraft of claim 11 wherein a rear of the jet engine is aft of the leading edge of the wing.

16. The aircraft of claim 13 wherein a rear of the jet engine is aft of the leading edge of the wing.

17. The aircraft of claim 1 wherein the trailing edge has a rearward sweep.

18. The aircraft of claim 11 wherein the trailing edge has a rearward sweep.

19. The aircraft of claim 13 wherein the trailing edge has a rearward sweep.

20. The aircraft of claim 14 wherein the trailing edge has a rearward sweep.

* * * * *